US011965129B1

(12) United States Patent
Aljuaydi et al.

(10) Patent No.: US 11,965,129 B1
(45) Date of Patent: Apr. 23, 2024

(54) METHOD AND SYSTEM FOR MITIGATING DOWNHOLE WATER PRODUCTION

(71) Applicant: SAUDI ARABIAN OIL COMPANY, Dhahran (SA)

(72) Inventors: Haitham Aljuaydi, Kharj (SA); Khalid Alhamed, Dammam (SA); Abdulrahman Alyoubi, Dammam (SA); Sajid Mehmood, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/059,358

(22) Filed: Nov. 28, 2022

(51) Int. Cl.
*C09K 8/42* (2006.01)
*C09K 8/44* (2006.01)
*E21B 33/124* (2006.01)

(52) U.S. Cl.
CPC ............... *C09K 8/426* (2013.01); *C09K 8/44* (2013.01); *E21B 33/124* (2013.01)

(58) Field of Classification Search
None
See application file for complete search history.

(56) References Cited

U.S. PATENT DOCUMENTS

| 5,161,615 A * | 11/1992 | Hutchins | C09K 8/512 166/295 |
| 2012/0298357 A1 * | 11/2012 | Ezell | C09K 8/508 166/279 |
| 2018/0327648 A1 * | 11/2018 | Bataweel | C04B 28/24 |
| 2019/0203097 A1 * | 7/2019 | Zielinski | C08G 18/73 |
| 2020/0340329 A1 * | 10/2020 | Al-Mulhem | E21B 33/124 |
| 2020/0407622 A1 * | 12/2020 | Bai | C08J 3/075 |
| 2022/0290033 A1 * | 9/2022 | Almohsin | C09K 8/516 |

OTHER PUBLICATIONS

Zhao, W., Xiao, J., Saiood, H. A., Otaibi, A. B., Huang, J., & Chang, F. F. (Jan. 13, 2020). Chemical Solution to ESP Packer Penetrator Corrosion Problem. International Petroleum Technology Conference.

Zhao, W., Huang, J., Zoraia, G. H., & Xiao, J. (Aug. 16, 2018). Development of Low-Density Rigid Gels/Composites for ESP Packer Penetrator Protection. Society of Petroleum Engineers.

Hunt, J. D., Ezzedine, S. M., Bourcier, W., & Roberts, S. (2013). Kinetics of the gelation of colloidal silica at geothermal conditions, and implications for reservoir modification and management (No. LLNL-CONF-614952). Lawrence Livermore National Lab. (LLNL), Livermore, CA (United States).

* cited by examiner

*Primary Examiner* — Andrew Sue-Ako
(74) *Attorney, Agent, or Firm* — Vorys, Sater, Seymour and Pease, LLP

(57) ABSTRACT

A method includes conveying a straddle packer assembly into a wellbore that provides a water production zone and first and second oil production zones, the water production zone interposing the first and second oil production zones, deploying the straddle packer assembly and thereby isolating the water production zone from the first and second oil production zones, injecting an injection fluid into the water production zone from the straddle packer assembly, and preventing the influx of water from the water production zone into the wellbore with the injection fluid.

20 Claims, 6 Drawing Sheets

METHOD AND SYSTEM FOR MITIGATING DOWNHOLE WATER PRODUCTION

FIELD OF THE DISCLOSURE

The present disclosure relates generally to water production mitigation strategies in hydrocarbon-producing wells and, more particularly, to water shut off methods using coiled tubing in horizontal oil wells.

BACKGROUND OF THE DISCLOSURE

In the production lifetime of oil and gas wells, hydrocarbon reservoirs will produce varying levels of water mixed within the extracted hydrocarbons. The likelihood of water production within a well increases as the well matures, and as the reservoir profile changes in response to phenomena such as water coning. As the water production increases with the maturity of the well, the cost of water separation and quality control increase such that the well may become financially infeasible to maintain. To remedy the issue of water production downhole, techniques have been developed for preventing water flow into the production tubing, also known as "water shutoff", which may prolong the lifetime of the well while increasing productivity.

Current water shutoff techniques are suitable for vertical wells as the water entry intervals or "production zones" may be isolated and further avoided. However, for horizontal oil producers, the water production zones may be trapped between two oil entry intervals or "production zones", such that traditional water shutoff techniques become more difficult. In traditional water shutoff techniques, a choice must be made to isolate or damage a producing production zone along with the water production zone. The sacrifice of a production zone along with the water production zone may adversely affect overall production and prevents the full benefit of water shutoff from being realized. As such, improved techniques are desirable for water shutoff in horizontal oil producers such that production zones are maintained and largely unaffected.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to various aspects of the present disclosure, a method includes conveying a straddle packer assembly into a wellbore that provides a water production zone and first and second oil production zones, the water production zone interposing the first and second oil production zones, deploying the straddle packer assembly and thereby isolating the water production zone from the first and second oil production zones, injecting an injection fluid into the water production zone from the straddle packer assembly, and preventing the influx of water from the water production zone into the wellbore with the injection fluid.

According to various additional aspects of the present disclosure, a wellbore system includes a wellbore extending from a well surface location and providing a water production zone and first and second oil production zones, the water production zone interposing the first and second oil production zones, and a straddle packer assembly installed in the wellbore to isolate the water production zone from the first and second oil production zones. An injection fluid is injected into the water production zone from the straddle packer assembly to create a non-porous material that prevents the influx of water from the water production zone into the wellbore.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
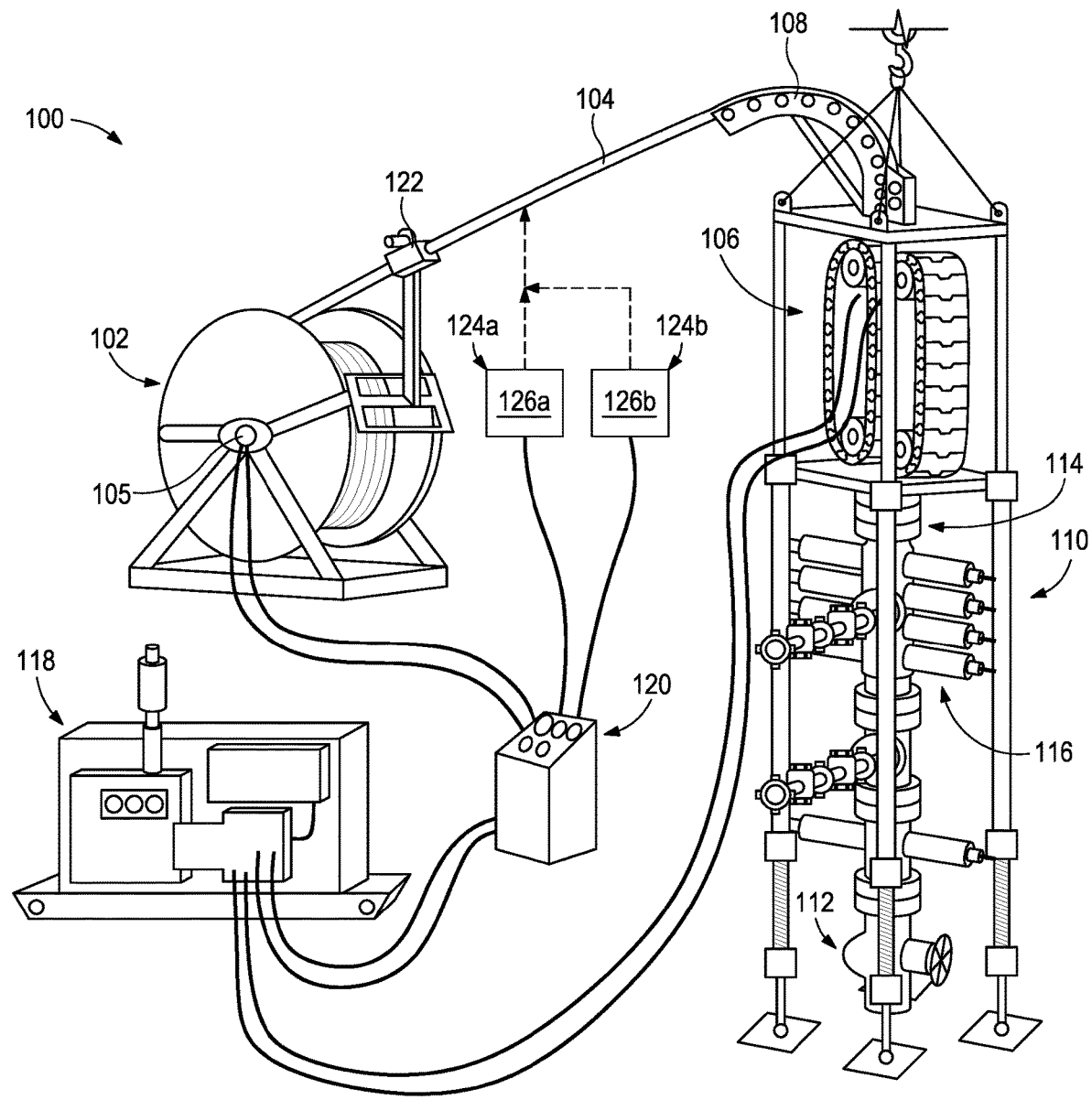
FIG. 1 is a schematic diagram of an example coiled tubing system that may be used in embodiments of the present disclosure

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to oil well water shutoff and, more particularly, to water shut off methods using coiled tubing in horizontal oil wells. The methods and systems described herein will allow well operators to isolate water producing zones trapped between two oil producing zones without adversely affecting the oil producing zones. This can be accomplished through the use of a retrievable straddle packer and selectively injecting formulated chemicals.

FIG. 1 is a schematic diagram of an example coiled tubing system 100 that may be used in embodiments of the present disclosure. As illustrated, the coiled tubing system 100 (hereafter "the system 100") includes a spool or "reel" 102, which serves as a storage apparatus for coiled tubing 104. The coiled tubing 104, alternately referred to as "coil" tubing, comprises a continuous length of flexible pipe capable of being wound onto and unwound from the reel 102. In some applications, the reel 102 may be mounted to a transport vehicle, such as a truck, but could alternatively be mounted to a production rig or may otherwise be skid-mounted. Rotation of the reel 102 may be controlled by a hydraulic motor 105 mounted as a direct drive on the reel 102 or operated by a chain-and-sprocket drive assembly (not shown).

The coiled tubing 104 is guided from the reel 102 to an injector assembly 106 via a tubing guide arch 108, alternately referred to as a "gooseneck." The tubing guide arch 108 supports the coiled tubing 104 through a bending radius, for example 90°, and guides the coiled tubing 104 into the injector assembly 106. The injector assembly 106, alternately referred to as an "injector head," is designed to grip the outer diameter of the coiled tubing 104 and provide the force required to convey the coiled tubing 104 into a wellbore and subsequently retrieve the coiled tubing 104. The injector assembly 106 is designed to support the full weight of the coiled tubing 104, and allows an operator to control the rate of lowering the coiled tubing 104 into the well.

Various designs and configurations of the injector assembly 106 may be used in accordance with the principles of the present disclosure. For example, the injector assembly 106 can include, but is not limited to, an opposed counter-rotating, chain drive system, an arched-chain roller drive system, a single-chain, opposed gripper-drive system, a sheave drive system, or any combination thereof. In the illustrated embodiment, the injector assembly 106 is depicted as a vertically mounted, counter-rotating chain drive system.

The system 100 may further include a well control stack 110 operatively coupled to the injector assembly 106 and interposing the injector assembly 106 and a wellhead 112, which constitutes the surface termination of a wellbore drilled into the underlying earth surface. The well control stack 110 can include, for example, a stripper assembly 114 and a blowout preventer or "BOP" 116. The stripper assembly 114 interposes the injector assembly 106 and the BOP 116 and provides the necessary pressure control and lubrication for the coiled tubing 104 as the coiled tubing 104 is conveyed downhole or retrieved.

The BOP 116 may comprise a plurality of hydraulically-operated rams. For example, the BOP 116 can include one or more blind rams, tubing shear rams, slip rams, and pipe rams. The blind rams may be used to seal off the wellbore at the surface if well control is lost. The tubing shear rams may be used to mechanically break (sever) the coiled tubing 104 in the event the coiled tubing 104 becomes stuck within the well control stack 110 or whenever it may be necessary to cut the coiled tubing 104 and remove the surface equipment from the well. The slip rams may include bidirectional teeth, which, when activated, secure against the coiled tubing 104 and support the weight of the coiled tubing 104 and any tools or assembly coupled thereto. The pipe rams may be equipped with elastomer seals and may be used to isolate the wellbore annulus pressure below the BOP 116.

The system 100 may further include a power source 118 used to power operation of the injector assembly 106 and the reel 102. In some applications, the power source 118 may comprise a hydraulic-pressure pump system including one or more multistage hydraulic pumps powered by one or more diesel engines. Alternatively, the power source 118 may comprise an electric generator system. The power source 118 may be designed to convey hydraulic fluid to operate various components of the system 100, such as the reel 102 and the injector assembly 106. In particular, among other operations, hydraulic fluid may be conveyed to operate the hydraulic motors 105 and the injector assembly 106, respectively, and thereby selectively control movement of the coiled tubing 104.

In some applications, the system 100 may also include a control console 120 in communication with the power source 118. The control console 120 can include various controls and gauges required to operate and monitor all of the components during operation of the system 100. An operator may be able to control operation of all facets of the system 100 from the control console 120. The hydraulic motors 105 and the injector assembly 106 may be activated (operated) via the control console 120, which may be configured to manipulate one or more valves that determine the direction of motion for the coiled tubing 104 and operating speed and braking. As the reel 102 is rotated by the hydraulic motors 105, the coiled tubing 104 may extend through a counter 122, which may be used in the determination of the depth achieved by the coiled tubing 104 through the measurement of the distance spooled from the reel 102. The counter 122 may be visible to an operator, or may be in communication with the control console 120, such that the depth is monitored automatically. In at least one application, one or both of the power source 118 and the control console 120 may be positioned on a transport vehicle along with the reel 102, but could alternatively comprise skid-mounted components. The control console 120, for example, may be arranged within a control cabin mounted to the bed of a truck.

According to embodiments of the present disclosure, the system 100 may further include one or more fluid reservoirs, shown as a first fluid reservoir 124a and a second fluid reservoir 124b. Each fluid reservoir 124a,b may be in fluid communication with the coiled tubing 104 and contain and otherwise store an injection fluid to be selectively introduced downhole via the coiled tubing 104. For example, the first fluid reservoir 124a may contain a first formulated chemical 126a and the second fluid reservoir 124b may contain a second formulated chemical 126b. As described in more detail below, the formulated chemicals 126a,b may be configured to assist in water shutoff in water producing zones of the wellbore.

More specifically, the first formulated chemical 126a may be introduced downhole to plug fractures (fissures) of a certain water producing zone (interval) of a subterranean formation penetrated by the wellbore. The first formulated chemical 126a may comprise, for example, water, N,N'-methylenebisacrylamide (Bis), N,N'-(1,2-dihydroxyethylene) bisacrylamide (DHEBA), and acrylamide. In contrast, the second formulated chemical 126b may be introduced downhole to react with the first formulated chemical 126a to reduce (damage) the permeability of the fractures (fissures) and thereby restrict fluid flow in the particular water producing zone. The second formulated chemical 126b may comprise, for example, water, tetramethylethylenediamine (TEMED), and ammonium persulfate. Those skilled in the art will readily appreciate that different chemical formulations and fluids may be used for the first and second formulated chemicals 126a,b, without departing from the scope of the disclosure.

The fluid reservoirs 124a,b may each be in communication with the control console 120. Consequently, the well operator may be able to selectively introduce the formulated chemicals 126a,b into the wellbore via the coiled tubing 104 as needed. While not shown, suitable plumbing (i.e., valves, flow meters, conduits, piping, etc.) may extend between the fluid reservoirs 124a,b and the coiled tubing 104 to facilitate injection of the formulated chemicals.

Figure 2A:
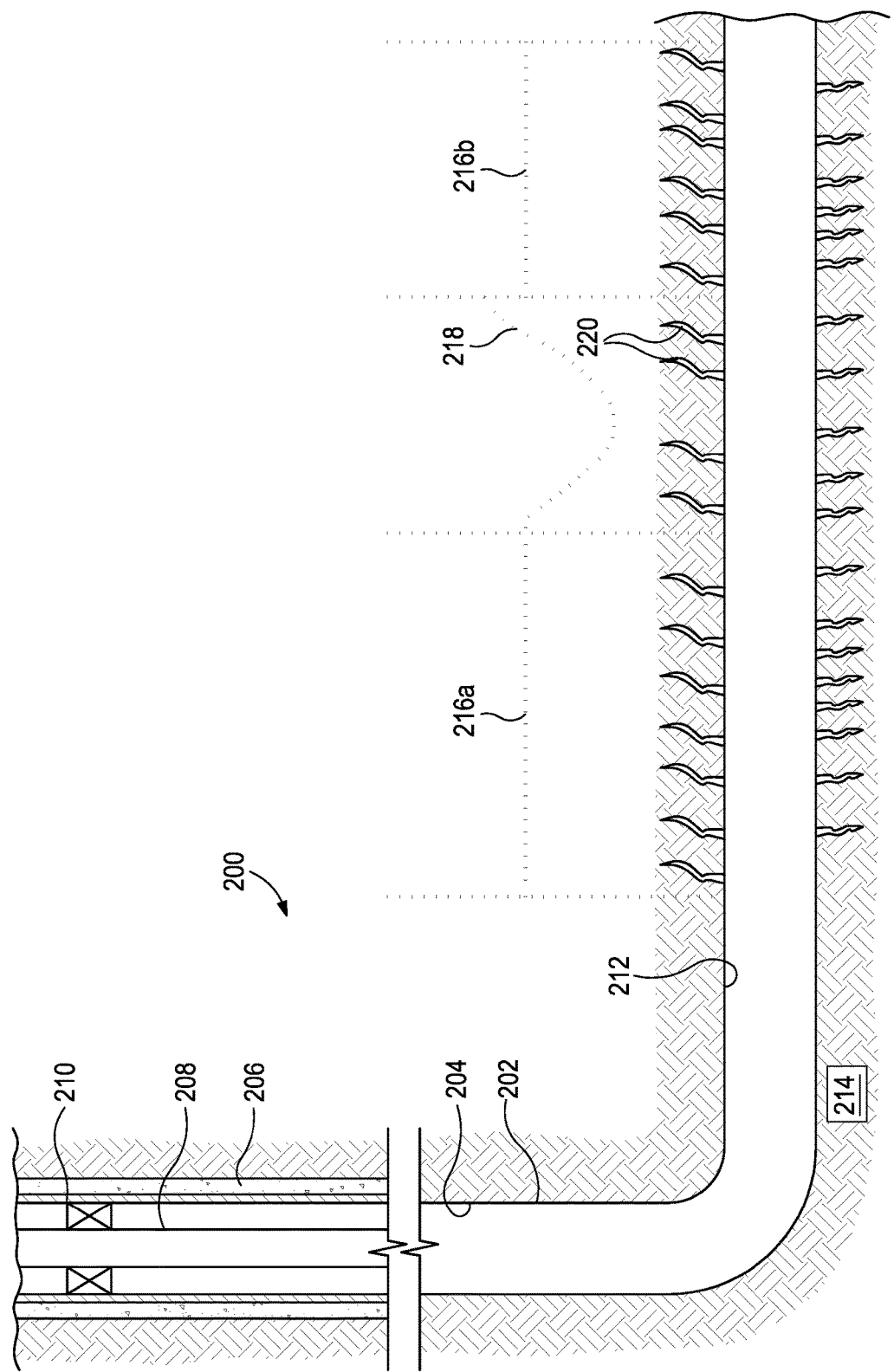
FIGS. 2A-2E are example schematics illustrating a water shutoff method according to an embodiment of the present disclosure.

FIGS. 2A-2E are example schematics illustrating progressive operation of an example water shutoff method, according to one or more embodiments of the present disclosure. Referring first to FIG. 2A, illustrated is a wellbore system 200 that may incorporate the principles of the present disclosure. The wellbore system 200 includes a defined wellbore 202 extending from a surface location, such as where the system 100 (FIG. 1) is installed. As illustrated, the wellbore 202 includes a substantially vertical section 204, and at least a portion of the vertical section 204 may be completed with casing 206 cemented therein. A liner 208 may be arranged within a portion of the casing 206 and secured therein using one or more packers 210.

The vertical section 204 transitions to a horizontal section 212 of the wellbore 202 which penetrates one or more subterranean formations 214. In some embodiments, the casing 206 and/or the liner 208 may extend into the horizontal section 212, however, in alternate embodiments the horizontal section 212 is uncompleted and considered an "open hole" section of the wellbore 202.

As illustrated, a plurality of entry intervals or "production zones" are identified along the horizontal section 212 of the wellbore 202. In particular, the horizontal section 212 includes at least two oil production zones, shown as a first oil production zone 216a and a second oil production zone 216b, and at least one water production zone 218 may axially interpose the oil production zones 216a,b along the wellbore 202. Each production zone 216a,b, 218 may have been previously hydraulically fractured, thereby resulting in a series of fractures 220 extending radially outward from the wellbore 202 along each production zone 216a,b, 218. The fractures 220 help facilitate fluid communication between the wellbore 202 and the surrounding subterranean formation 214.

The fractures 220 present in the water production zone 218 may be the primary mechanism through which water enters the wellbore 202. As previously discussed, traditional water shutoff techniques undertaken to mitigate or stop water production from a water production zone may force the loss or isolation of adjacent oil production zones along with the water production zone. In the present application, should the water production zone 218 be sealed off using traditional water shutoff techniques, the second oil production zone 216b located downhole from the water production zone 218 could potentially be similarly sealed or damaged along with any other intervals even further downhole. According to embodiments of the present disclosure, the water production zone 218 may first be isolated before undertaking a water shutoff technique.

Figure 2B:
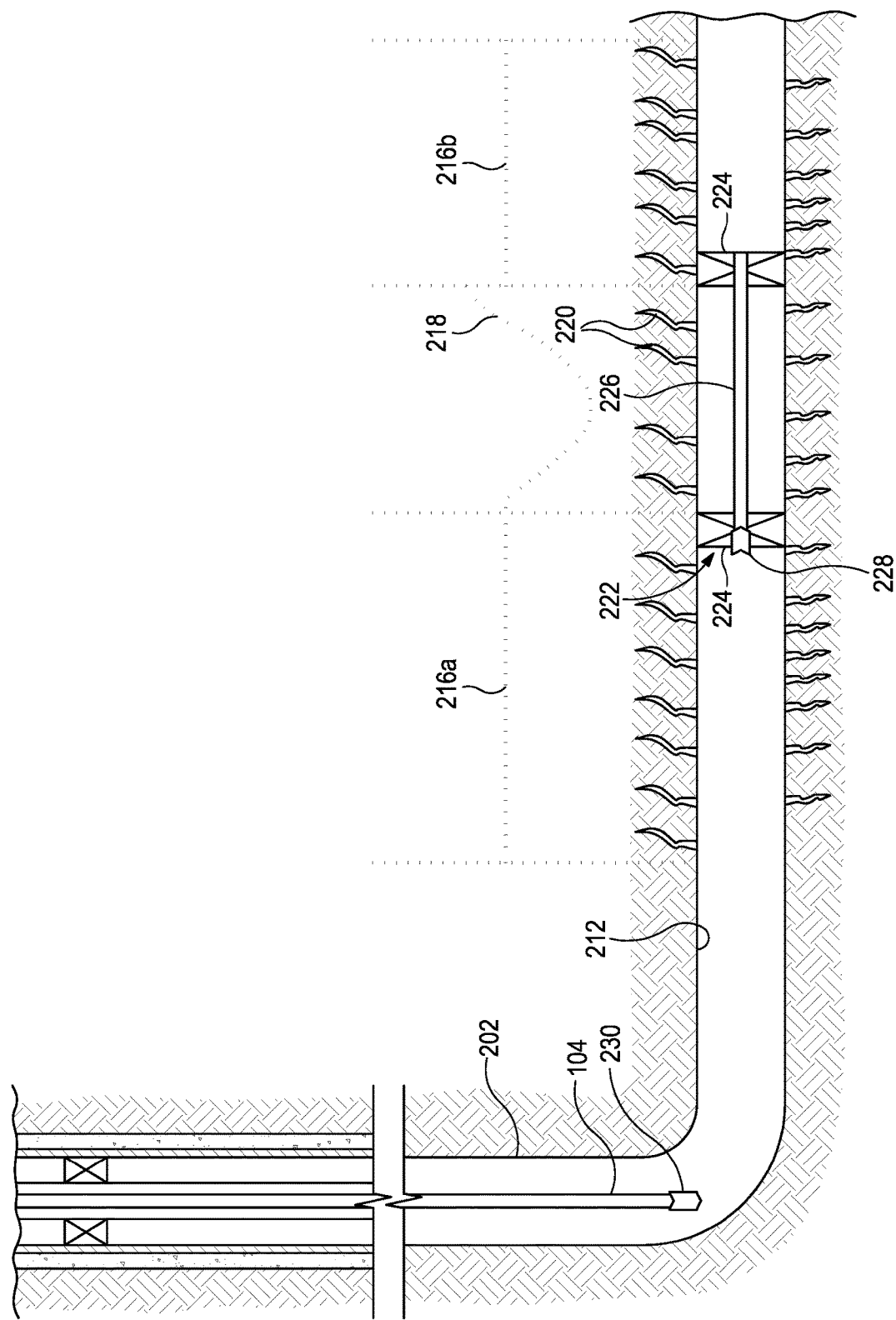

In FIG. 2B, for example, a straddle packer assembly 222 may be installed in the wellbore 202 to temporarily isolate the water production zone 218 from the remainder of the wellbore 202. The straddle packer assembly 222 may be conveyed downhole and installed using a variety of methods including, but not limited to, the coiled tubing 104, a wireline, or a jointed pipe, such as drill pipe. As illustrated, the straddle packer assembly 222 includes first (upper) and second (lower) wellbore packers 224 connected by a straddle pipe 226 extending between the wellbore packers 224.

During installation of the straddle packer assembly 222, the wellbore packers 224 are axially aligned along the interfaces between the water production zone 218 and the adjacent oil production zones 216a,b. The wellbore packers 224 may then be actuated such that they form a seal with the inner wall of the wellbore 202 and fully isolate the water production zone 218 uphole and downhole. The actuation of the wellbore packers 224 may include pneumatic inflation, a mechanical telescoping action, a hydraulic actuation, or any other reversible actuation mechanism which will temporarily set the wellbore packers 224.

While the wellbore packers 224 seal and separate the water production zone 218 from the remainder of the wellbore 202, the interior of the straddle packer assembly 222 remains in fluid communication with the water production zone 218. The interior of the straddle packer assembly 222 includes the straddle pipe 226, which may allow an injection fluid (e.g., the formulated chemicals 126a,b of FIG. 1) to be injected into the water production zone 218. For this purpose, the straddle pipe 226 may provide a series of exit ports (e.g., perforations, nozzles, etc.) that facilitate discharge of the injection fluid into the fractures 220 of the water production zone 218. According to embodiments of the present disclosure, the injected fluids may be used to slow or stop the influx of fluids (i.e., water) from the water production zone 218, but could alternatively be used for further fracturing operations or any additional fluid introduction operations.

The fluid injected into the water production zone 218, however, must be sourced externally from the straddle packer assembly 222. As such, the straddle packer assembly 222 may further comprise a port 228 configured to be mated to an external component to provide the injection fluid to be expelled (discharged) from the straddle pipe 226. To this end, the previously discussed coiled tubing 104 may be run downhole for the provision of the injection fluid from the surface to the straddle packer assembly 222. A nozzle 230 may be secured to the distal end of the coiled tubing 104 and configured to locate and mate with the port 228 as the coiled tubing 104 advances downhole. Once the nozzle 230 successfully mates with the port 228, the injection fluid from the surface may be conveyed (transferred, pumped, etc.) directly into the straddle pipe 226 without leakage.

Figure 2C:
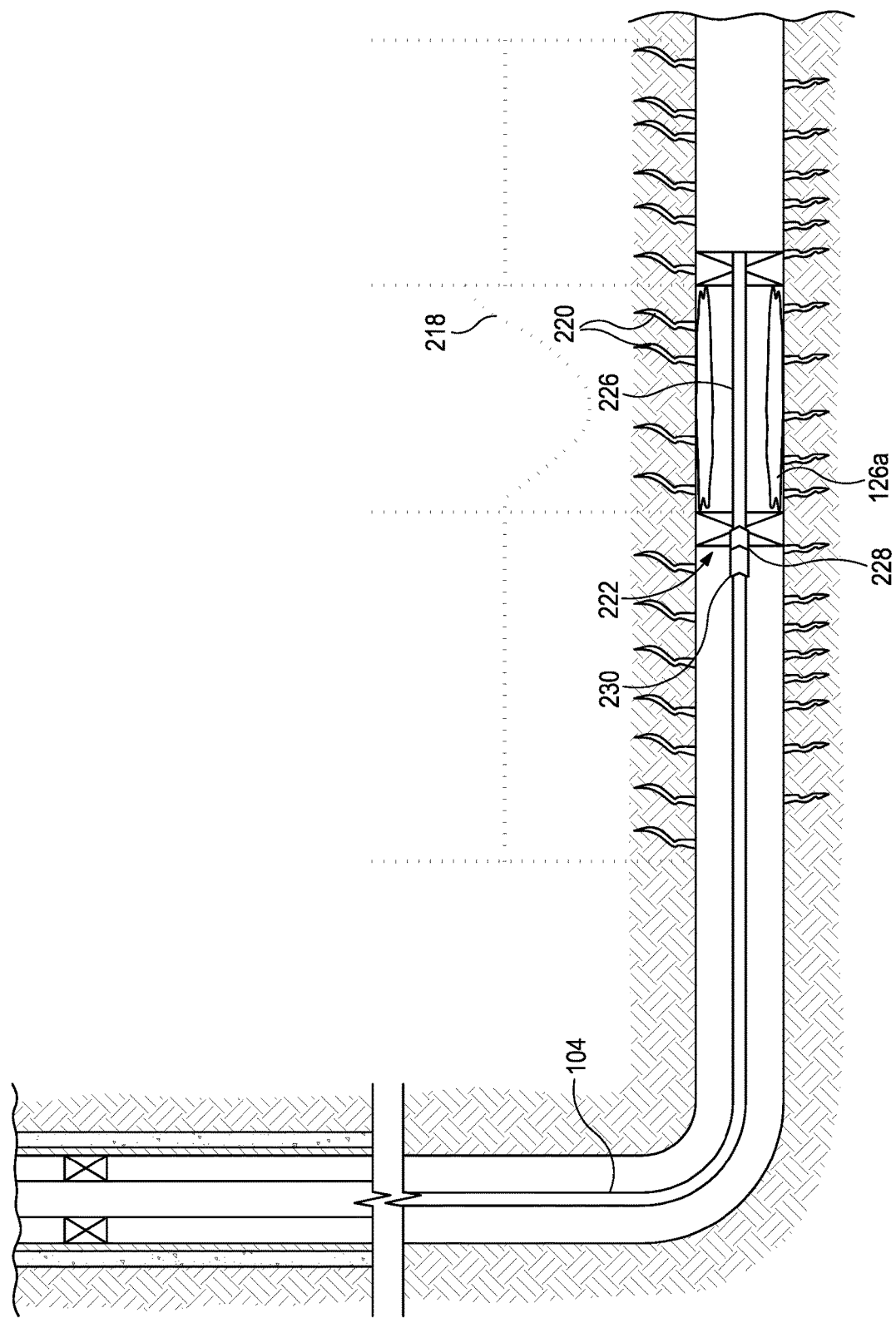

In FIG. 2C, the nozzle 230 is shown advanced to and mated with the port 228 of the straddle packer assembly 222 such that the coiled tubing 104, and therefore the system 100 (FIG. 1), is placed in fluid communication with the water production zone 218. After placing the system 100 in fluid communication with the straddle pipe 226, an injection fluid may be introduced to the water production zone 218 via the straddle packer assembly 222. More specifically, the first formulated chemical 126a may first be injected (introduced) into the water production zone 218 from the straddle pipe 226 and pumped (forced) into the adjacent series of fractures 220. As mentioned above, the first formulated chemical 126a may be configured to help plug the fractures 220, and thus may be injected until extending into and fully saturating at least a portion of the fractures 220. The injected first formulated chemical 126a then awaits the introduction of a reactant (i.e., the second formulated chemical 126b) to complete the water shutoff process.

Figure 2D:
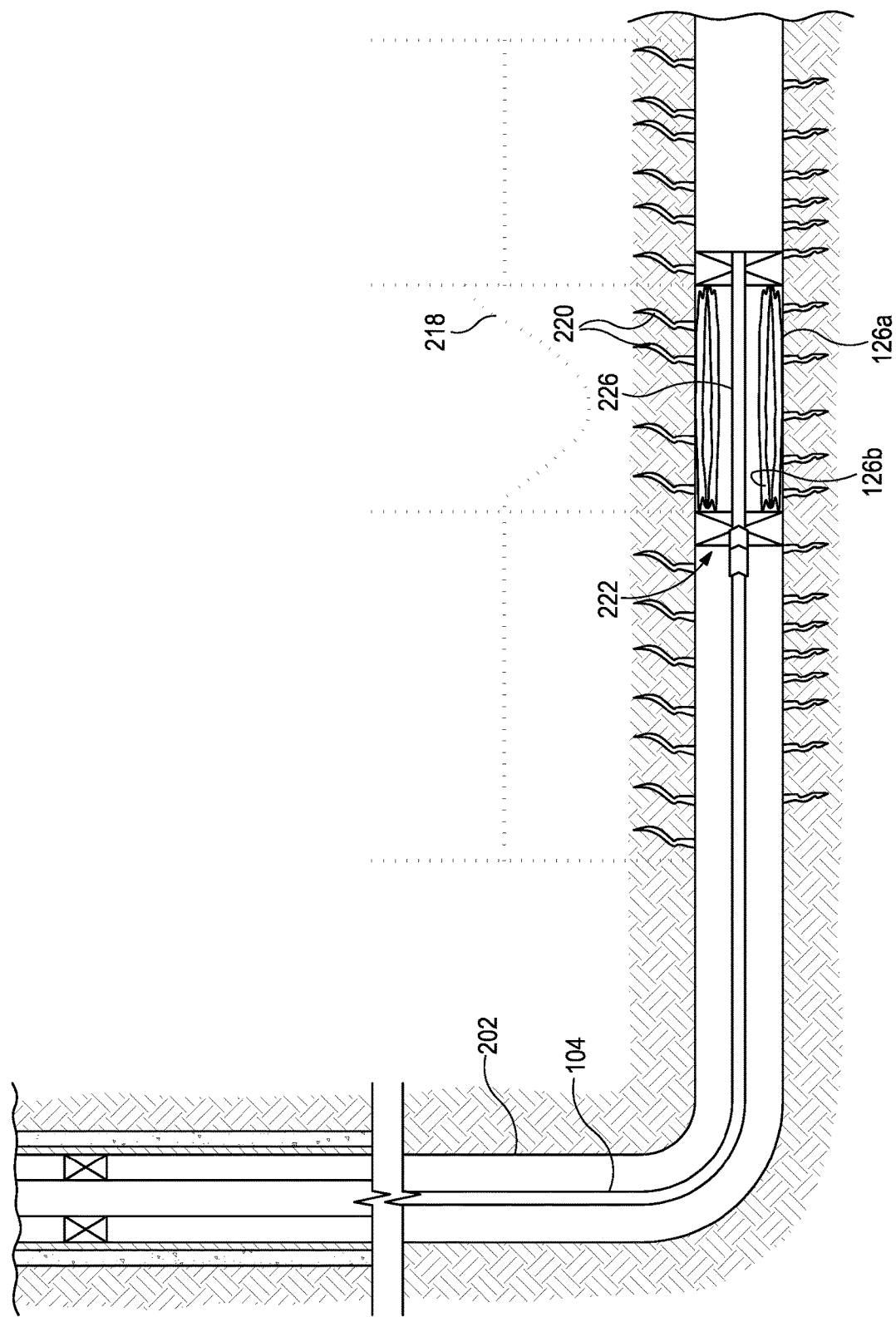

In FIG. 2D, the second formulated chemical 126b is shown being introduced into the water production zone 218 via the coiled tubing 104 and the interconnected straddle packer assembly 222. As the second formulated chemical 126b is injected into the water production zone 218 via the straddle pipe 226, a reaction may occur between the first and second formulated chemicals 126a,b within the series of fractures 220. As mentioned above, the second formulated chemical 126b may be configured to react with the first formulated chemical 126a to reduce (damage) the permeability of the fractures 220, and thereby restrict fluid flow from the water production zone 218. In at least one embodiment, the reaction between the formulated chemicals 126a,b may create a non-porous gel that forms a blockage such that water is substantially prevented from flowing into the wellbore 202 from the water production zone 218.

Figure 2E:
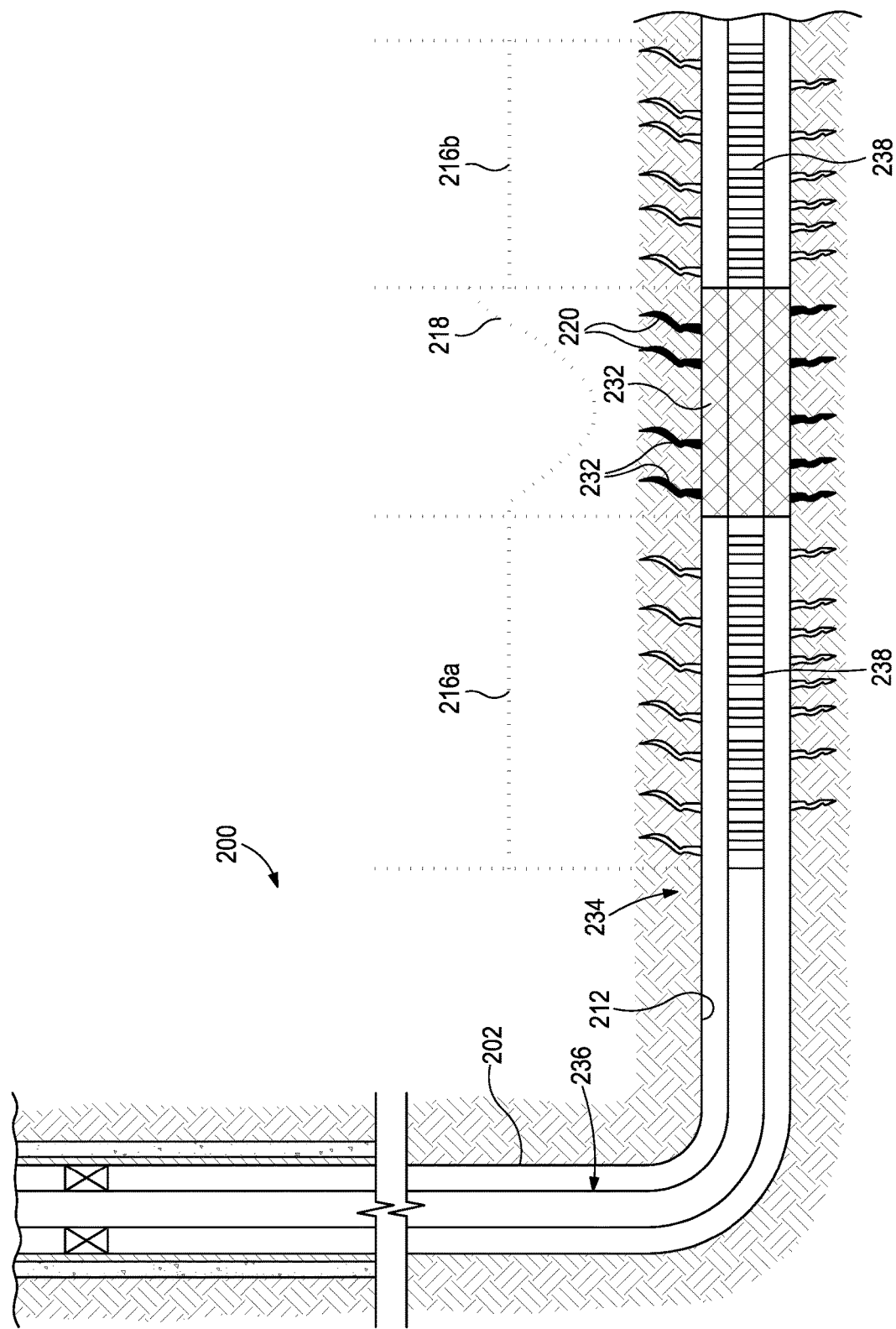

FIG. 2E shows the final result of the water shutoff method within the wellbore system 200 as performed in FIGS. 2A-2D. In FIG. 2E, the straddle packer assembly 222 (FIG.

2B-2D) has been retrieved after retraction of the wellbore packers 224 (FIGS. 2B-2D). With the reaction of the first formulated chemical 126a (FIGS. 2C-2D) and the second formulated chemical 126b (FIG. 2D), the series of fractures 220 within the water production zone 218 are now substantially blocked (clogged) with a non-porous material 232 (e.g., a gel) formed as a result of the reaction. In the case of the embodiment previously discussed, the non-porous material 232 may be in the form of a non-porous gel formed from the listed chemicals of the formulated chemicals 126a,b. Importantly, the non-porous material 232 has been created within the water production zone 218 without affecting permeability of the oil production zones 216a,b.

After removing the straddle packer assembly 222 (FIGS. 2B-2D) and the coiled tubing 104 (FIG. 1), a downhole completion 234 may be introduced, or reintroduced, into the horizontal section 212 of the wellbore 202. As illustrated, the downhole completion 234 may be operatively coupled to a string of production tubing 236 that extends to the well surface. The downhole completion 234 may also include a plurality of sand control screen assemblies 238 axially offset from each other along portions of the wellbore 202 and aligned with the corresponding oil production zones 216a,b. The downhole completion 234 may then be operated to extract hydrocarbons from the oil production zones 216a,b, while the water production zone 218 remains plugged (clogged) with the non-porous material 232, thus substantially decreasing or preventing the influx of water from the water production zone 218.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method, comprising:
conveying a straddle packer assembly into a wellbore that provides a water production zone and first and second oil production zones, the water production zone interposing the first and second oil production zones;
deploying the straddle packer assembly and thereby isolating the water production zone from the first and second oil production zones;
conveying an injection fluid to the straddle packer assembly, the injection fluid comprising a first formulated chemical comprising water, N,N'-methylenebisacrylamide (Bis), N,N'-(1,2-dihydroxyethylene) bisacrylamide (DHEBA), and acrylamide, and a second formulated chemical, comprising water, tetramethylethylenediamine (TEMED), and ammonium persulfate;
injecting the first formulated chemical into the water production zone;
injecting the second formulated chemical into the water production zone after the first formulated chemical;
reacting the second formulated chemical with the first formulated chemical and thereby creating a non-porous material; and
preventing an influx of water from the water production zone into the wellbore with the non-porous material.

2. The method of claim 1, wherein injecting the first and second formulated chemicals into the water production zone comprises pumping the first and second formulated chemicals into fractures defined in a subterranean formation adjacent the water production zone.

3. The method of claim 1, wherein conveying the injection fluid to the straddle packer assembly comprises:
deploying coiled tubing into the wellbore;
fluidly coupling the coiled tubing to the straddle packer assembly;
conveying the injection fluid into the straddle packer assembly from the coiled tubing; and
ejecting the injection fluid from the straddle packer assembly and into the water production zone.

4. The method of claim 3, wherein the straddle packer assembly includes first and second wellbore packers and a straddle pipe extending between the first and second wellbore packers, and wherein ejecting the injection fluid from the straddle packer assembly comprises injecting the injection fluid into the water production zone from the straddle pipe.

5. The method of claim 3, wherein fluidly coupling the coiled tubing to the straddle packer assembly comprises mating a nozzle arranged at a distal end of the coiled tubing to a port provided by the straddle packer assembly.

6. The method of claim 1, further comprising:
retrieving the straddle packer assembly from the wellbore;
introducing a downhole completion into the wellbore and aligning the downhole completion with the first and second oil production zones; and extracting hydrocarbons from the first and second oil production zones via the downhole completion.

7. The method of claim 1, wherein injecting an injection fluid into the water production zone comprises operating a control console to selectively introduce the first and second formulated chemicals into the coiled tubing.

8. The method of claim 7, wherein operating the control console further includes selectively pumping the first and second formulated chemicals from a first fluid reservoir and a second fluid reservoir in fluid communication with the control console and the coiled tubing.

9. A wellbore system, comprising:
a wellbore extending from a well surface location and providing a water production zone and first and second oil production zones, the water production zone interposing the first and second oil production zones; and
a straddle packer assembly installed in the wellbore to isolate the water production zone from the first and second oil production zones,
wherein an injection fluid is injected into the water production zone from the straddle packer assembly to create a non-porous material that prevents an influx of water from the water production zone into the wellbore,
wherein the injection fluid comprises a first formulated chemical comprising water, N,N'-methylenebisacrylamide (Bis), N,N'-(1,2-dihydroxyethylene) bisacrylamide (DHEBA), and acrylamide, and a second formulated chemical comprising water, tetramethylethylenediamine (TEMED), and ammonium persulfate, and
wherein the second formulated chemical is injected into the water production zone after injection of the first formulated chemical to react with the first formulated chemical and thereby create the non-porous material.

10. The wellbore system of claim 9, wherein the straddle packer assembly comprises:
first and second wellbore packers; and
a straddle pipe extending between the first and second wellbore packers, and wherein the injection fluid is injected into the water production zone from the straddle pipe.

11. The wellbore system of claim 10, wherein the first and second wellbore packers include a reversible actuation mechanism operable to temporarily set the first and second wellbore packers.

12. The wellbore system of claim 9, further comprising a coiled tubing system arranged at a surface location and including:
coiled tubing extendable into the wellbore; and
a nozzle secured to a distal end of the coiled tubing and matable with a port provided by the straddle packer assembly,
wherein mating the nozzle with the port places the straddle packer assembly in fluid communication with the coiled tubing.

13. The wellbore system of claim 12, wherein the coiled tubing system further includes:
a first fluid reservoir in fluid communication with the coiled tubing and containing the first formulated chemical;
a second fluid reservoir in fluid communication with the coiled tubing and containing the second formulated chemical; and
a control console in communication with the first and second fluid reservoirs and operable to selectively introduce the first and second formulated chemicals into the coiled tubing.

14. The wellbore system of claim 9, wherein the non-porous material comprises a gel.

15. The wellbore system of claim 9, further comprising a downhole completion arranged within the wellbore and aligned with the first and second oil production zones after removing the straddle packer, wherein hydrocarbons are extracted from the first and second oil production zones through the downhole completion.

16. The wellbore system of claim 15, wherein the downhole completion includes one or more sand control screen assemblies aligned with the first and second oil production zones.

17. The wellbore system of claim 15, further including a string of production tubing operatively coupled to the downhole completion and extending to the well surface location.

18. The wellbore system of claim 9, wherein the wellbore comprises a substantially vertical section including a casing and a horizontal section penetrating a subterranean formation including the first and second oil production zones.

19. The wellbore system of claim 18, wherein the horizontal section is an uncompleted, open hole of the wellbore.

20. The wellbore system of claim 9, wherein one or more fractures are defined within the first and second oil production zones and the water production zone.

* * * * *